April 8, 1958      J. G. JARVIS      2,829,689
PRESSURE CUTTING UNIT HAVING LONGITUDINALLY
INCLINED CUTTING BLADES
Filed Nov. 16, 1955      3 Sheets-Sheet 1
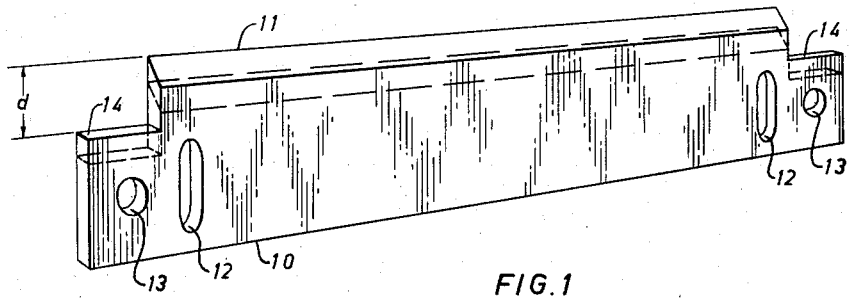
FIG. 1
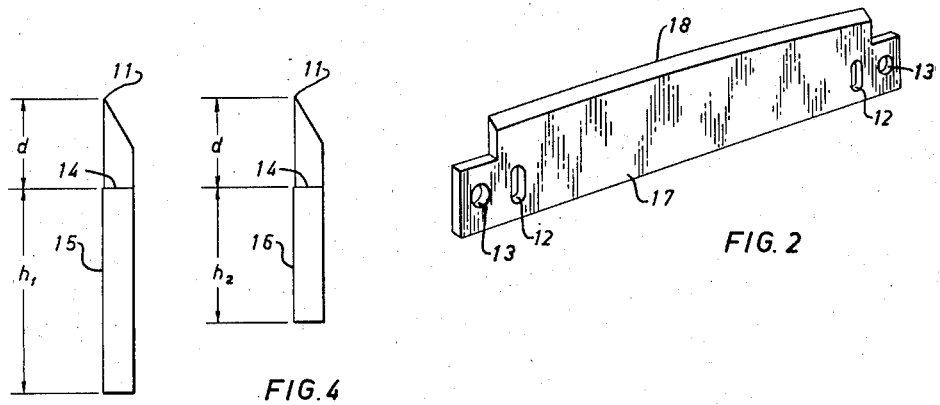
FIG. 4
FIG. 3
FIG. 2
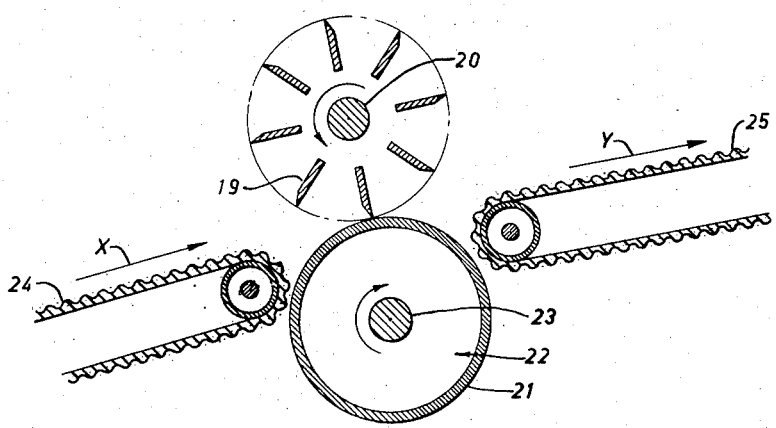
FIG. 5
Inventor
JAMES G. JARVIS
by: J. Richard Cavanagh April 8, 1958 J. G. JARVIS 2,829,689
PRESSURE CUTTING UNIT HAVING LONGITUDINALLY
INCLINED CUTTING BLADES
Filed Nov. 16, 1955 3 Sheets-Sheet 2

Inventor
JAMES G. JARVIS by: J. Richard Cavanagh

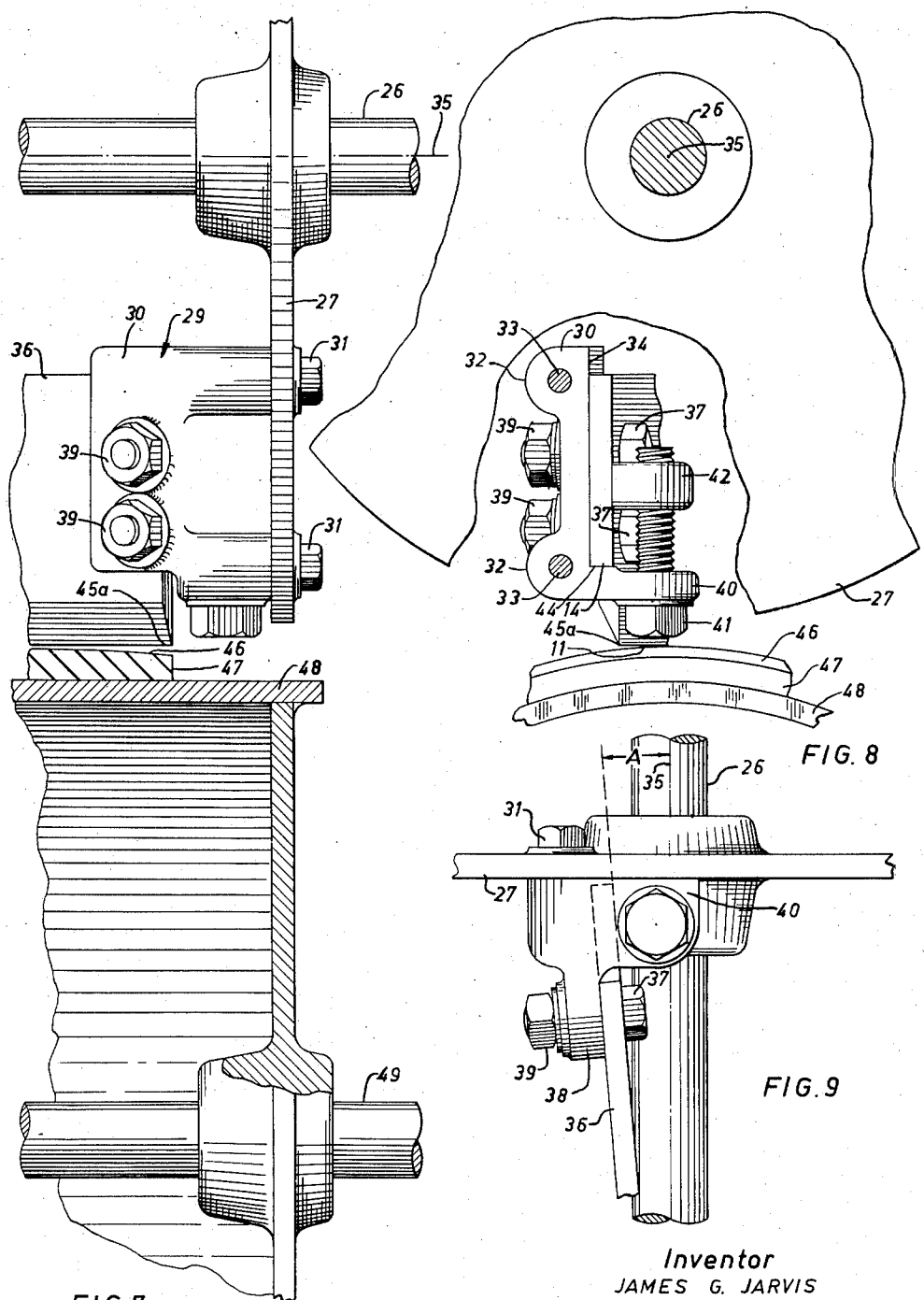

United States Patent Office 2,829,689
Patented Apr. 8, 1958

2,829,689

PRESSURE CUTTING UNIT HAVING LONGITUDINALLY INCLINED CUTTING BLADES

James Gordon Jarvis, Meadowvale, Ontario, Canada, assignor to Grasslander Co. Limited, Milverton, Ontario, Canada Application November 16, 1955, Serial No. 547,208

4 Claims. (Cl. 146—117)

This invention relates to a pressure cutting device having longitudinally inclined rotary pressure cutting blades, particularly adapted for the cutting of straw or like material for livestock feed.

The term "pressure cut" or "pressure cutting" as used in this specification is intended to refer to a type of cut or a cutting action embodying those mechanical principles characterized by the severance of material by a cutting edge moving under pressure through the material to engage a surface supporting the material; that is, the chopping of the material against the supporting surface, as contrasted with the shearing of material between a shearing edge moving past another shearing edge. One little used form of hay cutting device of the manually actuated hay cutting mechanisms used up to the middle of the last century was of the pressure cutting type and was of a form in which a pressure cutting straw severing blade was carried for rotation about a shaft in such manner that the cutting edge was disposed truly parallel in all respects to the rotational axis. The cutting blade was rotated into registry with a cutting strip of brass, zinc or other firm but soft material carried by a drum or the like and penetrated the surface thereof to effect severance of straw impinged between the cutting edge and cutting strip as the drum and cutting knife rotated in opposite directions inwardly to feed the cut material therebetween during the cutting action. While such manually actuated mechanisms effected an efficient cutting of the straw, it was difficult to sharpen the cutting blade to satisfactory tolerance to conform to complete engagement throughout its length with the co-operating surface of the cutting strip on the co-operating drum. Moreover, there was a tendency to provide such firm engagement of the cutting edge of the knife with the cutting strip that a vibration or bumping effect would be accomplished upon each straw severing rotation causing severe wear of the cutting edge. So far as applicant is aware, this old form of device was never placed in commercial use in a power driven form as a hay cutting device. While such a device doubtless would work for a short period of time if power driven, it would not seem to be practical in such a crude form and this may explain the reason for its abandonment for agricultural uses substantially for the past century.

It is the main object of the present invention to provide a pressure cutting device in which flat cutting knives are supported for rotation about an axis but are inclined longitudinally with respect to said axis to present a substantially straight cutting edge to a substantially cylindrical supporting surface of a co-operating drum whereby substantially only a point contact of a cutting edge may be accomplished at any one moment with the surfaces of the cutting drum to thus minimize the creation of vibrations during cutting of straw or the like.

It is another object of the invention to provide a cutting device as set forth in which the cutting blade is adapted to be sharpened to close tolerance and adapted to be mounted in a position of registry with surfaces of the co-operating drum.

With these and other objects in view, the invention will be appreciated in more detail by reference to the following specification taken in conjunction with the accompanying drawings.

In the drawings:

Figure 1 is a perspective view of a preferred form of cutting blade of the invention;

Figure 2 is a view of a modified form of cutting blade of the invention having a slightly curved cutting edge hereinafter defined as substantially straight;

Figure 3 is an enlarged end view of the cutting blade of Figure 1;

Figure 4 is an end view of the cutting blade of Figure 3 after sharpening a number of times;

Figure 5 illustrates a manner of use of the cutting blades of the invention;

Figure 7 is an enlarged sectional detail of a portion of a structure similar to that of Figure 6 but modified in the showing of a cutting blade having a straight cutting edge coacting with a longitudinally convex drum and showing the manner of mounting one end of a cutter blade of the invention;

Figure 8 is an end view of the structure of Figure 7 partially cut away to reveal detail;

Figure 9 is an underside view of the cutting blade structure of Figure 8; and

Figure 6:
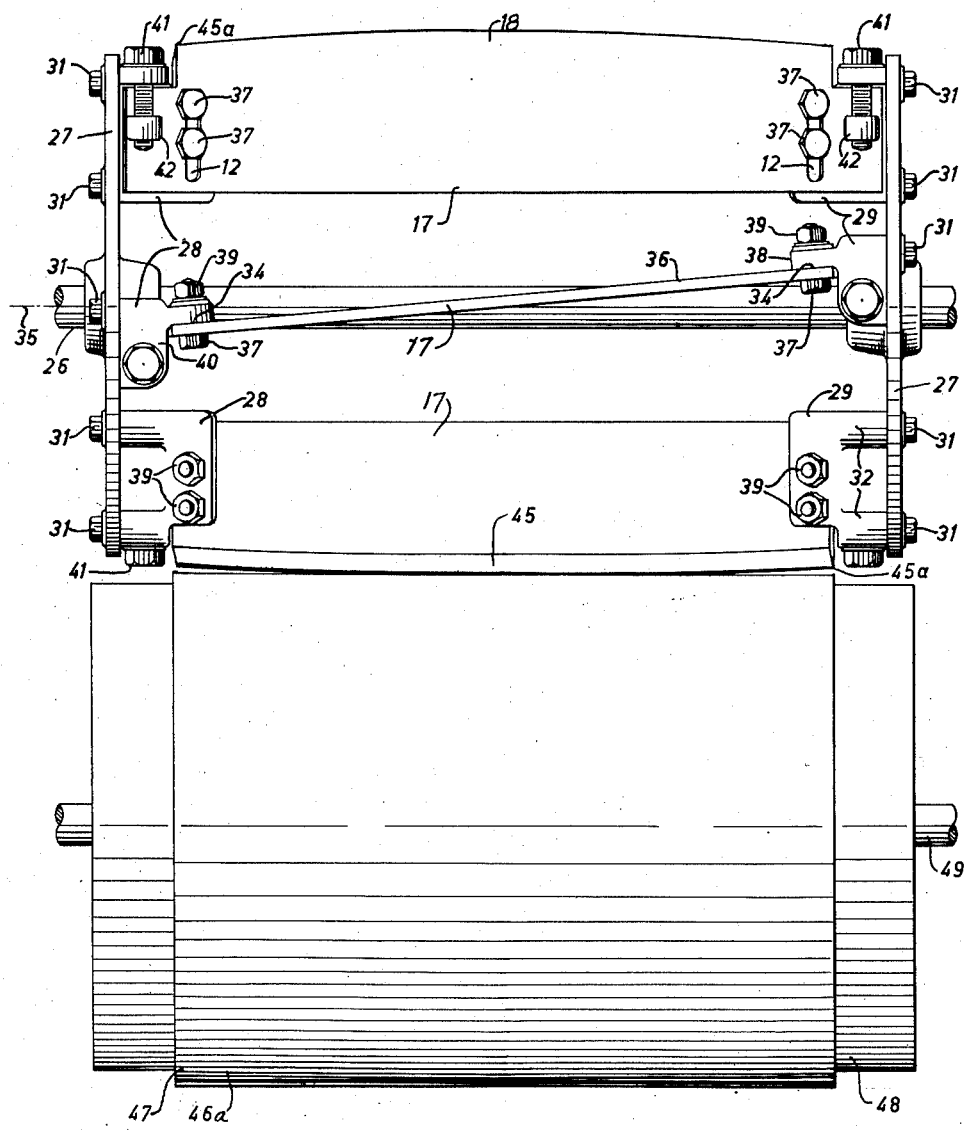
Figure 6 is an elevation of cutting blades of the invention mounted in supporting apparatus and disposed in operative position relative to pressure cut supporting means in this case in the form of a rotatable drum.
Figure 10:
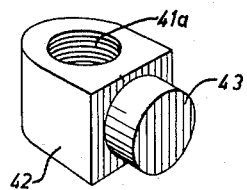
Figure 10 is an enlarged perspective view of an adjustable clamping stud of the clamping structure shown in Figures 7 and 8.

Referring to the drawings and particularly Figure 1, a cutting blade 10 is shown of rectangular form cut from flat steel plate stock and having a straight cutting edge 11 formed longitudinally thereof. The blade 10 carries spaced end slots 12 and adjacent clamping holes or openings 13 by which the blade may be securely mounted in a support therefor disclosed in more detail hereinafter with reference to Figures 6 to 10.

The ends of the blades 10 present locating shoulders 14 spaced a predetermined distance $d$ from the sharpened edge 11 which latter terminates at the leading face 15 of the blade. The invention contemplates the resharpening of the blade 10 in such manner that it may be relocated in its mounting without disturbing the distance relation between the sharpened edge 11 and the mounting (not shown).

Thus, in Figures 3 and 4, the sharpened edge 11 is shown spaced a predetermined distance $d$ from the shoulder 14. At each resharpening of the blade 10, the cutting or sharpened edge 11 is again ground to a predetermined distance $d$ from the shoulder 14 as shown in Figure 4 so that finally the body 16 of the blade is of substantially lesser height $h2$ than the initial height $h1$ shown in Figure 3. A similar blade to that of Figure 1 is shown in Figure 2 and is designated by the numeral 17. While like numerals designate like components, the change in this form is the convex curvature 18 of the sharpened edge.

While it is preferred to provide a cutting blade having a truly straight edge 11 as shown in Figure 1, the invention also contemplates the provision of a substantially straight edge 18 as shown in Figure 2 being only slightly outwardly curved to compensate for the longitudinal inclination of the blade when used with a pressure cutting support in the form of a truly cylindrical drum or the like, as set forth hereinafter.

In use, a plurality of cutting blades 19 of the invention are supported for rotation relative to axis 20 for pressure contact engagement with a pressure cutting support 21 in the form of a drum-like element 22 rotating on axis 23 so that belt 24 feeding straw or the like in the direction of arrow X projects the straw between the cutting blades 19 and the drum 22 effecting severance of the straw. Conveyor 25 moving in the direction of arrow Y serves to carry cut material away from cutters or blades 19 and drum 22. The mechanism shown in Figure 5 may be incorporated in various types of farm implement, for example, a hay harvester, in which the belt 24 receives straw from a conventional pickup device operatively related thereto (not shown).

The outwardly curved cutting blade of the invention is preferably mounted in the manner shown in Figure 6. The straight cutting blade is mounted in the same manner as shown in Figures 7 to 10 but cooperates with a convex pressure cutting supporting drum. A suitable shaft 26 carries the spaced apart members 27 having fixed thereto the blade carrying left and right hand fittings 28 and 29. The fittings 28 and 29 comprise a cast body 30 fastened to the corresponding member 27 by suitable bolts 31 threaded into enlarged portions 32 of the body as at 33. A blade supporting face 34 is provided on the body and is inclined longitudinally relative to the axis 35 of shaft 26 as shown in Figure 9 at an angle $a$ preferably of about five degrees. The body and blade supporting surface 34 thereof extend to support the blade 36 by bolts 37 extending through the slots 12 of the blade and suitable holes in the flange portion 38 of the body to be retained by the nuts 39. A clamping bracket 40 projects from the body 30 over the shoulder 14 of the cutting blade and carries a locking bolt 41 adapted to engage in threaded bore 41a of clamping fitting 42 shown in more detail in Figure 10 and carrying a locking stud 43 adapted to tightly seat within the clamping opening 13 of the cutting blade. A blade locating surface 44 is provided in the clamping bracket 40 adjacent the blade supporting surface 34 of the body whereby the shoulder 14 of the cutting blade may be firmly drawn into engagement therewith by means of the clamping bolt 41. After firm location of the blade on its locating shoulder, as set forth, the clamping bolts 37 are tightened to fix the blade relative to the fitting body 30. In this manner, the cutting edge 11 or 18 as the case may be is accurately located relative to the axis of shaft 26. Fitting 28 is of similar design of left hand or opposite inclination.

The cutting blades are arranged with their cutting edges radially equidistant from the axis of shaft 26 at a point intermediate the spaced apart supporting members 27. Thus, the lowermost blade shown in Figure 6 is shown in contact at a mid-point 45 with the surface 46 on a pressure cutting support 47, on drum 48 rotatable on supporting shaft 49 disposed in parallel spaced apart relation to shaft 26. In the form of the invention illustrated in Figure 7, the cutting edges 11 of the blades 10 being straight and the blades being inclined longitudinally at an angle with respect to the axis of the shaft 26, the radial distance of the cutting edge 11 at the ends 45a thereof from the axis 35 of shaft 26 will be greater than at the point 45. The pressure cutting support 47 is provided in the form of a rubber or other elastomer body vulcanized or cemented to the cylindrical drum 48. The longitudinally convex surface 46 in Figure 7 is formed by cutting the body to the desired contour, such contour being of a shape conforming to that generated by the cutting edges of the cutting blades 10 during rotation thereof.

It is contemplated that the generally flat rectangular pressure cutting blades of the invention may be returned to the factory or to a service point for resharpening, in which case the provision of a cutting edge of slight curvature such as is indicated in Figures 2 and 6, is practical and enables the use of a pressure cutting supporting surface 46a of simple cylindrical form. Obviously a slightly curved edge requires the use of special grinding equipment whereas the straight cutting edge of the preferred form enables the sharpening of the cutting blade to satisfactory tolerance with conventional power grinding equipment.

By reason of the support of the cutting blade preferably at a longitudinally inclined angle, the blade effects a pressure cutting action at progressive increments along its length so that at any point of time, the necessary power consumed in the cutting action is a minimum. It will be understood, however, that the cutting blade of the invention may be formed and supported in the manner shown but in longitudinal alignment with the axis of rotation thereof without departing from the invention.

What I claim as my invention is:

1. Pressure cutting apparatus for cutting straw and like forage material and comprising in combination: a straight flat generally rectangular cutting blade body; a substantially straight pressure cutting edge formed longitudinally on said body and extending substantially the full length thereof; a bracket for each end of said body; cutting edge locating means on each end of said blade body adjacent the cutting edge thereof and spaced a predetermined fixed distance from said cutting edge; a locating surface on said bracket engageable by said locating means of said blade body for predetermined fixed positioning of said cutting edge with respect to said bracket; a rotatable cutter shaft; axially spaced apart support members on said cutter shaft rotatable therewith; means fastening the brackets at the ends of said cutting blade body to said support members to dispose said blade therebetween in a theoretical plane intersecting said cutter shaft substantially midway between said support members; a pressure cutting supporting member in the form of a drum rotatable on an axis parallel to but spaced from said cutter shaft; and means having a cooperating pressure cutting surface supported by said drum and engageable with a portion only of said blade upon engagement with the latter.

2. Pressure cutting apparatus for cutting straw and like forage material and comprising in combination: a straight flat generally rectangular cutting blade body; a straight pressure cutting edge formed longitudinally on said body and extending substantially the full length thereof; a bracket for each end of said body; cutting edge locating means on each end of said blade body adjacent the cutting edge thereof and spaced a predetermined fixed distance from said cutting edge; a locating surface on said bracket engageable by said locating means of said blade body for predetermined fixed positioning of said cutting edge with respect to said bracket; a rotatable cutter shaft; axially spaced apart support members on said cutter shaft rotatable therewith; means fastening the brackets at the ends of said cutting blade body to said support members to dispose said blade therebetween in a theoretical plane intersecting said cutter shaft substantially midway between said support members; a pressure cutting supporting member in the form of a drum rotatable on an axis parallel to but spaced from said cutter shaft; and means having a slightly longitudinal convex pressure cutting surface mountable on said drum and engageable with a portion only of the cutting edge of said blade upon engagement with the latter.

3. Pressure cutting apparatus for cutting straw and like forage material and comprising in combination: a straight flat generally rectangular cutting blade body; a slightly outwardly curved pressure cutting edge formed longitudinally on said body and extending substantially the full length thereof; a bracket for each end of said body; cutting edge locating means on each end of said blade body adjacent the cutting edge thereof and spaced a predetermined fixed distance from said cutting edge;

a locating surface on said bracket engageable by said locating means of said blade body for predetermined fixed positioning of said cutting edge with respect to said bracket; a rotatable cutter shaft; axially spaced apart support members on said cutter shaft rotatable therewith; means fastening the brackets at the ends of said cutting blade body to said support members to dispose said blade therebetween in a theoretical plane intersecting said cutter shaft substantially midway between said support members; a pressure cutting supporting member in the form of a drum rotatable on an axis parallel to but spaced from said cutter shaft; and means on said drum providing a cylindrical cooperating pressure cutting surface therein engageable with a portion only of the cutting edge of said blade upon engagement with the latter.

4. Pressure cutting apparatus for cutting straw and like forage material and comprising in combination: a straight flat generally rectangular cutting blade body; a substantially straight pressure cutting edge formed longitudinally on said body and extending substantially the full length thereof; a bracket for each end of said body; cutting edge locating means on each end of said blade body adjacent the cutting edge thereof and spaced a predetermined fixed distance from said cutting edge; a locating surface on said bracket engageable by said locating means of said blade body for predetermined fixed positioning of said cutting edge with respect to said bracket; a rotatable cutter shaft; axially spaced apart support members on said cutter shaft rotatable therewith; means fastening the brackets at the ends of said cutting blade body to said support members to disposed said blade therebetween in a theoretrical plane intersecting said cutter shaft substantially midway between said support members; a pressure cutting supporting member in the form of a drum rotatable on an axis parallel to but spaced from said cutter shaft; and elastomer means having a slightly longitudinal convex pressure cutting surface mountable on said drum and engageable with a portion only of the cutting edge of said blade upon engagement with the latter.

References Cited in the file of this patent
UNITED STATES PATENTS

| | | |
|---|---|---|
| 61,933 | Gale | Feb. 12, 1867 |
| 2,355,358 | Anderson | Aug. 8, 1944 |
| 2,399,529 | Willits | Apr. 30, 1946 |
| 2,491,196 | Millard | Dec. 13, 1949 |
| 2,704,096 | Olsen | Mar. 15, 1955 |
| 2,735,469 | West | Feb. 21, 1956 |

UNITED STATES PATENT OFFICE

CERTIFICATE OF CORRECTION

Patent No. 2,829,689                                            April 8, 1958

James Gordon Jarvis

It is hereby certified that error appears in the above numbered patent requiring correction and that the said Letters Patent should read as corrected below.

In the grant, lines 2 and 3, for "assignor to Grasslander Co. Limited, of Milverton, Ontario, Canada," read -- assignor, by mesne assignments, to Grasslander (1957) Limited, of Milverton, Ontario, Canada, --; line 12, for "Grasslander Co. Limited, its successors" read -- Grasslander (1957) Limited, its successors --; in the heading to the printed specification, lines 4 to 6, for "assignor to Grasslander Co. Limited, Milverton, Ontario, Canada" read -- assignor, by mesne assignments, to Grasslander (1957) Limited, Milverton, Ontario, Canada --.

Signed and sealed this 18th day of November 1958.

(SEAL)
Attest:

KARL H. AXLINE                                              ROBERT C. WATSON
Attesting Officer                                     Commissioner of Patents